(12) United States Patent
Herzberg et al.

(10) Patent No.: US 7,540,012 B1
(45) Date of Patent: May 26, 2009

(54) VIDEO ON DEMAND CONFIGURING, CONTROLLING AND MAINTAINING

(75) Inventors: Louis Paul Herzberg, Monsey, NY (US); Charles Steven Lingafelt, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1044 days.

(21) Appl. No.: 09/590,203

(22) Filed: Jun. 8, 2000

Related U.S. Application Data

(60) Provisional application No. 60/138,172, filed on Jun. 8, 1999.

(51) Int. Cl.
*H04N 7/173* (2006.01)

(52) U.S. Cl. .............. 725/87; 725/42; 725/91; 725/96; 209/217; 209/212

(58) Field of Classification Search ........... 725/87–104, 725/37–61; 709/217–223
See application file for complete search history.

(56) References Cited

U.S. PATENT DOCUMENTS

| | | | | |
|---|---|---|---|---|
| 5,295,244 A * | 3/1994 | Dev et al. .................... | 715/853 |
| 5,355,302 A * | 10/1994 | Martin et al. ............... | 700/234 |
| 5,623,613 A * | 4/1997 | Rowe et al. ................. | 715/841 |
| 5,751,965 A * | 5/1998 | Mayo et al. ................. | 709/224 |
| 5,793,438 A * | 8/1998 | Bedard ........................ | 725/43 |
| 5,886,995 A * | 3/1999 | Arsenault et al. ........... | 370/477 |
| 5,926,230 A * | 7/1999 | Niijima et al. .............. | 725/56 |
| 5,929,932 A * | 7/1999 | Otsuki et al. ................. | 725/47 |
| 6,025,869 A * | 2/2000 | Stas et al. .................... | 725/28 |
| 6,054,987 A * | 4/2000 | Richardson ................. | 715/734 |
| 6,088,722 A * | 7/2000 | Herz et al. ................... | 709/217 |
| 6,131,086 A * | 10/2000 | Walker et al. ................ | 705/26 |
| 6,138,150 A * | 10/2000 | Nichols et al. .............. | 709/219 |
| 6,144,702 A * | 11/2000 | Yurt et al. ............... | 375/240.01 |
| 6,177,931 B1 * | 1/2001 | Alexander et al. ........... | 725/52 |
| 6,211,901 B1 * | 4/2001 | Imajima et al. .............. | 725/93 |
| 6,262,722 B1 * | 7/2001 | Allison et al. ................ | 725/39 |
| 6,281,898 B1 * | 8/2001 | Nikolovska et al. ......... | 715/848 |
| 6,314,434 B1 * | 11/2001 | Shigemi et al. ............. | 707/203 |
| 6,314,573 B1 * | 11/2001 | Gordon et al. ................ | 725/61 |
| 6,347,303 B2 * | 2/2002 | Nagai et al. .................... | 705/7 |
| 6,374,336 B1 * | 4/2002 | Peters et al. ................. | 711/167 |
| 6,415,298 B1 * | 7/2002 | Oesterer et al. ............. | 707/203 |
| 6,473,751 B1 * | 10/2002 | Nikolovska et al. ............ | 707/3 |
| 6,492,997 B1 * | 12/2002 | Gerba et al. ................. | 345/721 |
| 6,505,348 B1 * | 1/2003 | Knowles et al. ............... | 725/49 |

(Continued)

*Primary Examiner*—Annan Q Shang
(74) *Attorney, Agent, or Firm*—Scully, Scott, Murphy & Presser, P.C.; Lisa M. Yamonaco, Esq.

(57) ABSTRACT

A method and system for providing multilevel information about video-on-demand services. The method comprises the steps of generating a display, on a computer display screen, of a tree having a plurality of nodes; and embedding in the nodes information about video-on-demand services. Preferably information is embedded in these nodes in the form of matrices. A wide range of information about the video-on-demand service may be embedded in the display. For instance, information may be embedded about usage patterns between the supplier of the video services and the consumer, a list of users, user statistics, satisfaction rates, failure rates, failure causes, rates of view to completion, cost monitor information, customer payment information, menus of videos, charge variations, special features and offers, user age, user education, geography, and any combination of the above.

17 Claims, 16 Drawing Sheets

U.S. PATENT DOCUMENTS

| | | | |
|---|---|---|---|
| 6,515,680 B1 * | 2/2003 | Hendricks et al. | 345/716 |
| 6,519,009 B1 * | 2/2003 | Hanaya et al. | 348/564 |
| 6,563,515 B1 * | 5/2003 | Reynolds et al. | 715/721 |
| 6,564,378 B1 * | 5/2003 | Satterfield et al. | 725/40 |
| 6,598,230 B1 * | 7/2003 | Ballhorn | 725/118 |
| 6,622,148 B1 * | 9/2003 | Noble et al. | 707/104.1 |
| 6,628,302 B2 * | 9/2003 | White et al. | 345/717 |
| 6,637,029 B1 * | 10/2003 | Maissel et al. | 725/46 |
| 6,732,369 B1 * | 5/2004 | Schein et al. | 725/39 |
| 6,754,906 B1 * | 6/2004 | Finseth et al. | 725/45 |
| 2002/0107838 A1 * | 8/2002 | Tsai | 707/3 |
| 2003/0108048 A1 * | 6/2003 | Kwok et al. | 370/395.6 |
| 2004/0062270 A1 * | 4/2004 | Son et al. | 370/465 |

\* cited by examiner

|   | Endpoint 1 | Endpoint 2 | Endpoint 3 | Endpoint 4 | Endpoint 5 | Endpoint 6 | Endpoint 7 |
|---|---|---|---|---|---|---|---|
| Endpoint A |   |   |   |   |   |   |   |
| Endpoint B |   |   |   |   |   |   |   |
| Endpoint C |   |   |   |   |   |   |   |
| Endpoint D |   |   |   | Intersection of Element 4 with Element D |   |   |   |
| Endpoint E |   |   |   |   |   |   |   |
| Endpoint F |   |   |   |   |   |   |   |
| Endpoint G |   |   |   |   |   |   |   |

"ABC" Catalog of Endpoints — 310

"123" Catalog of Endpoints — 320

VIDEO ON DEMAND CONFIGURING, CONTROLLING AND MAINTAINING

CROSS REFERENCE

This application claims priority from U.S. Provisional Application No. 60/138,172, filed on Jun. 8, 1999.

This application is also related to the following copending applications, filed herewith, Ser. No. 60/138,172, "Control And Maintenance Of Multicast Distribution Employing Embedded Displays,";

Ser. No. 09/590,205, "Controlling, Configuring, Storing, Monitoring And Maintaining Accounting Or Bookkeeping Information Employing Trees With Nodes Having Embedded Information,";

Ser. No. 09/590,323, A Method Of Control, Maintenance And Allocation Of Computer Server Farms Resources And Other Resource Farms To Their Users,":

Ser. No. 09/590,206, "Doing Business Employing Linked Trees Having Retrievable Embedded Information,";

which are all incorporated herein by reference in entirety.

This application is also cross referenced with copending application Ser. No. 09/327,708, entitled, "Representing, Configuring, Administering, Monitoring, and/or Modeling Connections Using Catalogs and Matrixes," by E. H. Booth et al., filed Jun. 8, 1999, the disclosure of which is incorporated herein by reference in entirety;

The disclosure of this application is related to the disclosures of the following U.S. patents:

U.S. Pat. No. 5,289,460, "Maintenance of Message Distribution Trees in a Communications Network," by Drake, Jr. et al., issued Feb. 22, 1994;

U.S. Pat. No. 5,724,646, "Fixed video-on-demand," by A. Ganek et al., issued Mar. 3, 1998;

U.S. Pat. No. 5,682,597, "Hybrid Video-on-demand Based con a Near-video-on-demand System," by A. Ganek et al., issued Oct. 28, 1997;

U.S. Pat. No. 5,459,725, "Reliable Multicasting over Spanning Trees in Packet Communications Networks," by Bodner, R. A. et al., issued Oct. 17, 1995;

U.S. Pat. No. 4,277,837, "Personal Portable Terminal for Financial Transactions," by Stuckert, P. E., issued Jul. 7, 1981;

U.S. Pat. No. 4,106,667, "Apparatus and Method for Conducting Financial Transactions," by Lynott, J. J., issued Aug. 15, 1978;

which are all incorporated herein by reference in entirety.

BACKGROUND OF THE INVENTION

This invention generally relates to video-on-demand; and more specifically, the invention relates to monitoring various aspects of video-on-demand services.

Video-on-demand (VOD) is a service system in which customers or subscribers are able to choose interactively various programs stored in a video source and can view a selected program at any time, instead of only receiving predetermined television programs from broadcasting stations. The VOD users are normally able to operate the selected programs in the same way they are able to use a video cassette recorder, including replay, rewinding, pause and recording of the served video programs. In addition, numerous video and audio services such as video games, video conferencing and home shopping can be offered to the users of the VOD service system.

Developing provision of a large assortment of video and other multimedia presentations in video-on-demand, VOD, and presentation-on-demand, POD, to large groups of viewers requires control, monitoring and maintenance of many different facets of the provision. This includes obtaining, updating, storing, deleting and/or archiving the presentations; providing connectivity assets for provision of each requested presentation (this includes: [multiple] channel identification; and dividing and subdividing primary, secondary and tertiary servers at regional [central] offices to efficiently provide each presentation to a particular group of users in its regions in satisfying each users particular time to view the particular presentation. Other important facets of VOD include receiving, routing, and combining user requests; monitoring each user's usage for cost determination and billing; and determine the healthfulness of all facets of the provision, etc.

SUMMARY OF THE INVENTION

An aspect of this invention is to use a tree representation to represent and to monitor various aspects of a video on demand service system.

Another aspect of the present invention is to form catalogs to represent one or more distribution aspects of video on demand service systems, and to use those catalogs to form displays that illustrate information about the distributions.

These and other aspects are attained with a method and system for providing multilevel information about video-on-demand services. The method comprises the steps, as represented in FIG. 1D, of generating a display, on a computer display screen, of a tree having a plurality of nodes; and embedding in the nodes information about video-on-demand services. Preferably information is embedded in these nodes in the form of matrices.

A wide range of information about the video-on-demand service may be embedded in the display. For instance, information may be embedded about usage patterns between the supplier of the video services and the consumer, a list of users, user statistics, satisfaction rates, failure rates, failure causes, rates of view to completion, cost monitor information, customer payment information, menus of videos, charge variations, special features and offers, user age, user education, geography, and any combination of the above.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 3 shows a matrix with Catalog "123" versus Catalog "ABC" with one connection identified;

FIG. 10 shows an example of a matrix of connections showing possible monitoring method;

DETAILED DESCRIPTION OF THE PREFERRED EMBODIMENTS

The complex presentation provisions of video on demand and presentation-on-demand, with desirable connection, usage, control and maintenance requirements can be advantageously handled, configured, administered and monitored employing a tree representation. This tree is herein referred to as a 'usage' tree. The usage tree representation is performed with particular novelties satisfying the particularities of multimedia presentation VOD delivery requirements.

The trees may be shown bottom up (extending upward from the root node); and trees may similarly be formed and/or displayed top down (extending downward from the root node), sideways (from the root node) or in any combination of these (as known to those skilled in the art). The particular tree formation and/or display is formed as is best suited to the particular application and/or display, and in accordance with the desire of a viewer or user. In some embodiments these display variations are selectable by the user. When more than one tree is displayed (e.g. in a split screen utilization), each tree may be formed and/or displayed in a different form/shape.

Figure 1A:
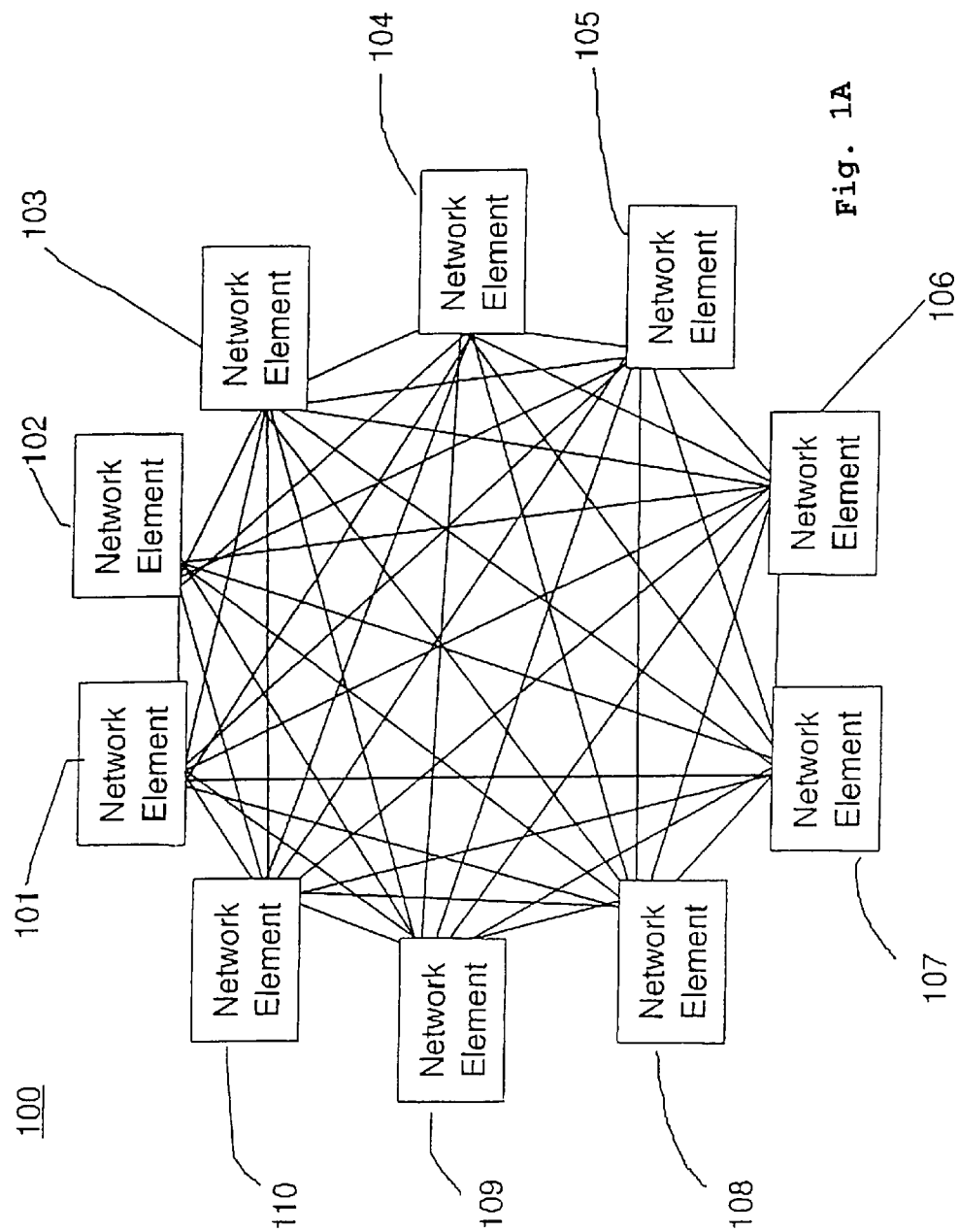
FIG. 1A shows a distribution over a provider's network elements.
Figure 1B:
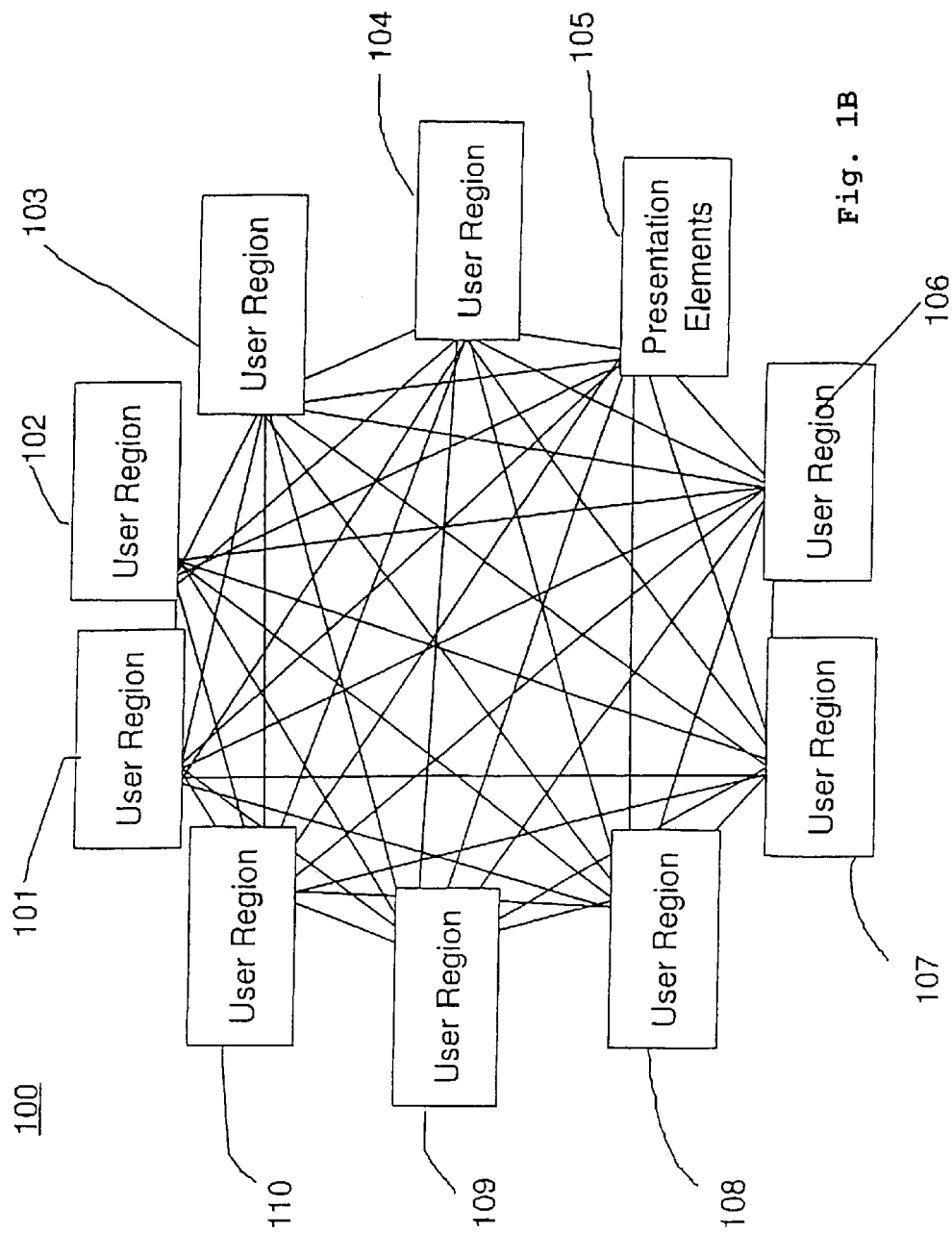
FIG. 1B shows a distribution of users in a mess configuration.
Figure 1C:
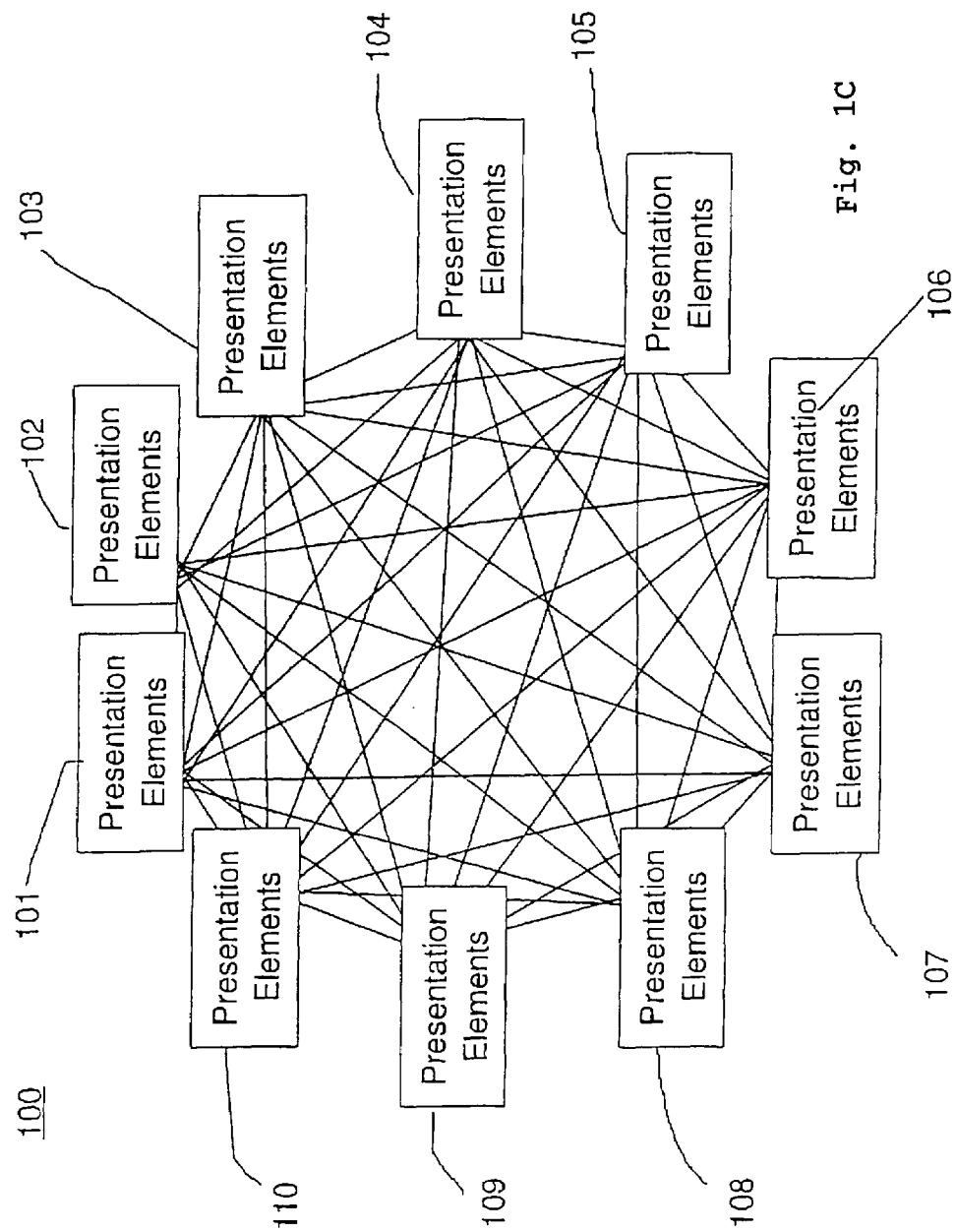
FIG. 1C shows a distribution of servers having an assortment of presentation elements
Figure 1D:
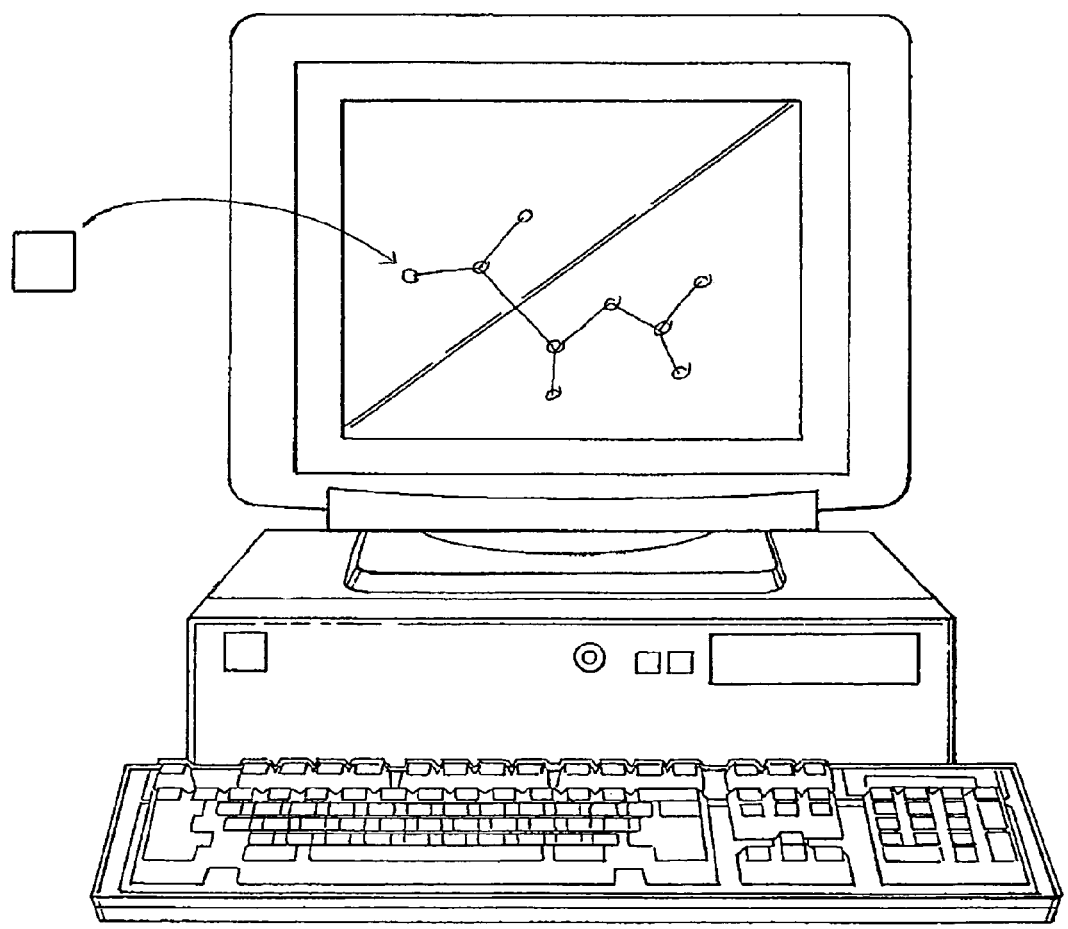
FIG. 1D illustrates a computer display of a tree having a plurality of nodes, and embedding information in those nodes.
Figure 2:
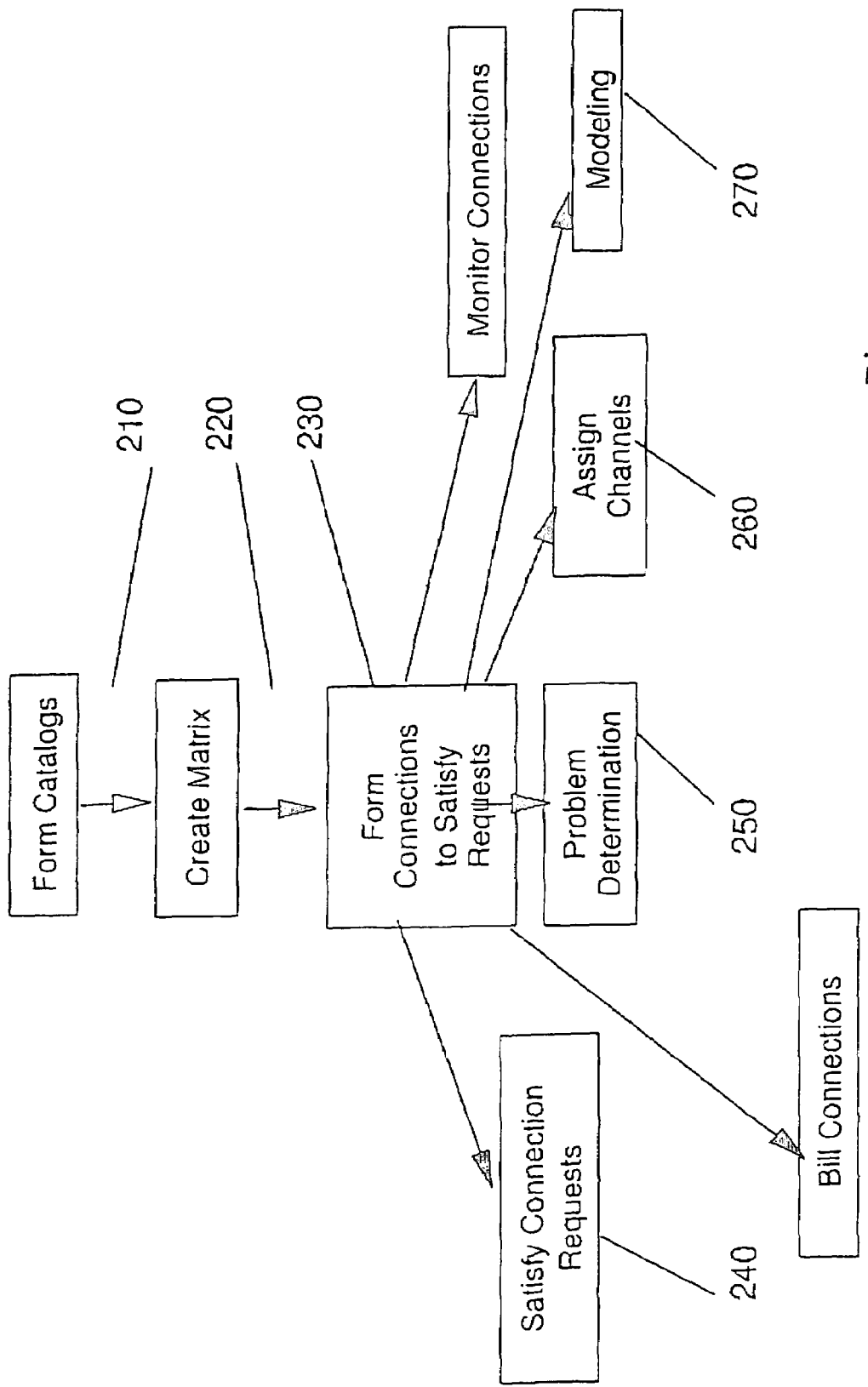
FIG. 2 illustrates an example of a High-level flow of method.

FIGS. 1A and 1B show two of these facets, more specifically, FIG. 1A shows a distribution over the provider's network elements for its area of coverage. FIG. 1B shows a distribution of users in these areas of coverage in a mess configuration. Alternatively a star or ring configuration may be used. FIG. 1C shows a distribution of servers having an assortment of presentation elements. Similar distributions are assumed for other facets of the provider's provision. In accordance with the present invention, catalogs are formed to represent one or more of these distributions, as shown in FIG. 2.

Generally, with the procedure outlined in FIG. 3, at step 210, a catalog is formed; and at step 220, a matrix is created from the catalog. Step 230 is to form connections to satisfy requests. More specifically, as represented at 240, connection requests are satisfied. As represented by 250, 260 and 270, a determination may be made of any problems, channels may be assigned, and desired or appropriate modeling may be performed.

Each of these distribution is advantageously formed and controlled using catalogs of distribution endpoints as shown in FIG. 3. This is an example of the presentation elements distribution. Each (123) endpoint corresponds to a particular presentation, and each 'ABC' endpoint corresponds to one or more channel number that is used to provide each particular endpoint. Thus, in a single fixed time provision, only one channel needs to be provided. In a video-on-demand type of provision, several channels are used to provide different segments of the particular presentation. Sometimes these segments are offset in time from another.

It should be noted that, each particular presentation need not be actually resident at its specific endpoint, but in many cases the presentation is forwarded from one region to the others as user demand requires. Also, each server at each user region may generally store a subset of the provider's total presentation library. In addition, preferably, servers share their assets, and servers share presentation demand loads when user regions are not balanced.

Figure 4:
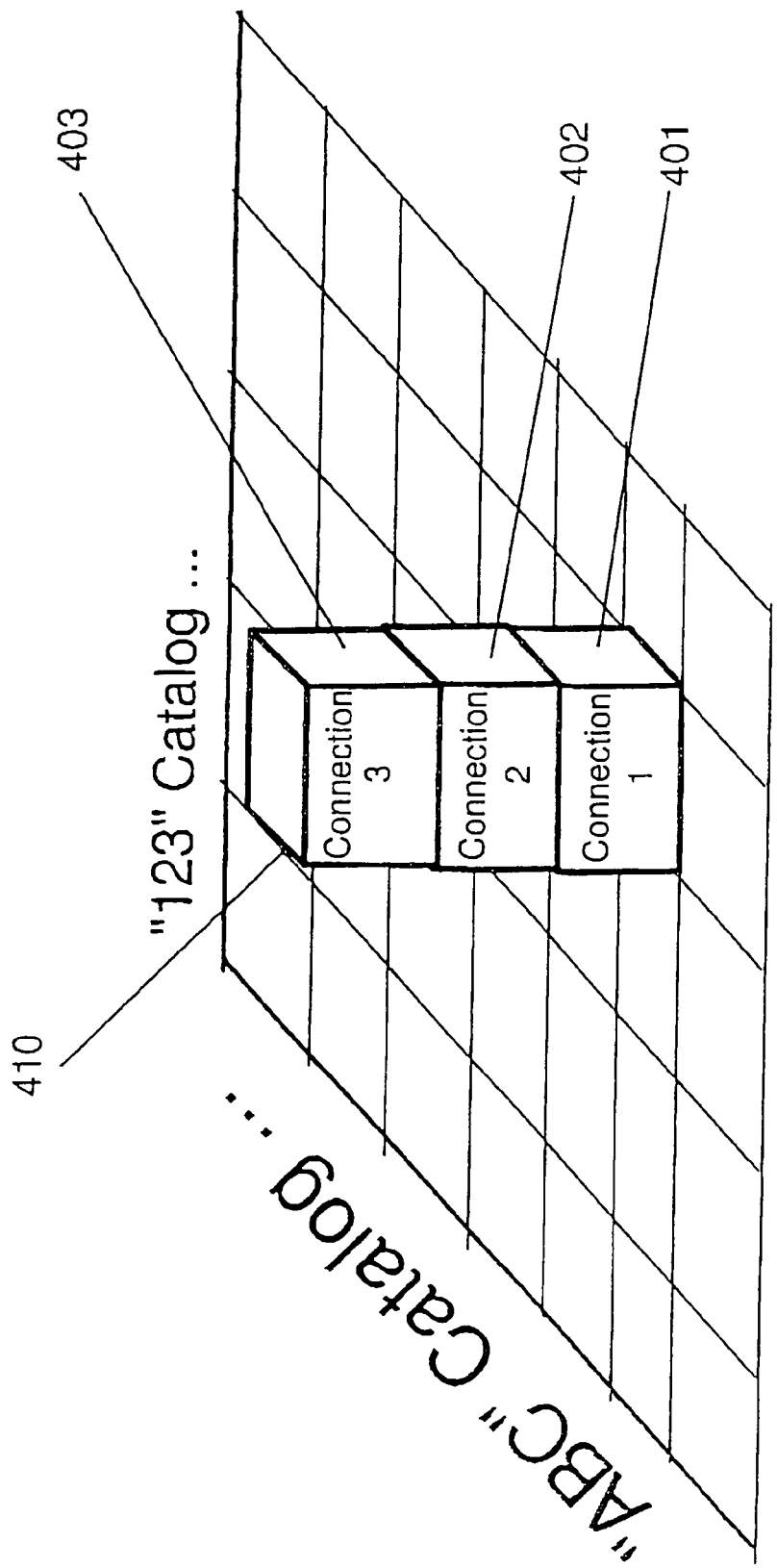
FIG. 4 shows a matrix with multiple connections at the same intersection identified.

These types of utilization's are stored in connections background information levels, as shown in FIG. 4. Each background level give information regarding a different facet of the provision specific to the distribution to which it is related.

Information may be displayed to show one distribution offset, on top of, or to a side of another distribution. The displays indicate information about the distribution in different ways. For instance, the color and/or color intensity is used to show the number of users requesting and/or receiving a particular distribution.

A matrix method may also be used to display the relationship between users and presentations. In FIG. 3, each element of the "123" catalog of endpoints corresponds to a particular presentation, and each element of the "ABC" catalog of endpoints corresponds to a user or consumer of the presentation. The intersection between elements of the catalogs represents a presentation which the user is receiving. The user ("ABC" catalog element) may have an attribute that specifies which channel(s)/connection paths the element is capable of receiving. The intersection could also contain information about which channel is being used to move the presentation to the endpoint.

This matrix method may also be used to display the relationship between primary servers and secondary servers. In FIG. 3, each element in the "123" catalog of endpoints corresponds to a particular primary server for set of servers, and each element in the "ABC" catalog of endpoints corresponds to a particular secondary server or a set of secondary servers. The intersection between elements of the catalogs represents logical connection(s) of a presentation flowing from the primary server to a secondary server. Further, as shown in FIG. 4, if multiple presentations are flowing between a primary and a secondary server, the multiple logical connections of the multiple presentations flowing from the primary server to the secondary server can be represented by a 3D-like stack of blocks, with each block representing a different connection/presentation. Further, the "ABC" catalog of secondary servers could be a catalog of user endpoints.

Figure 5:
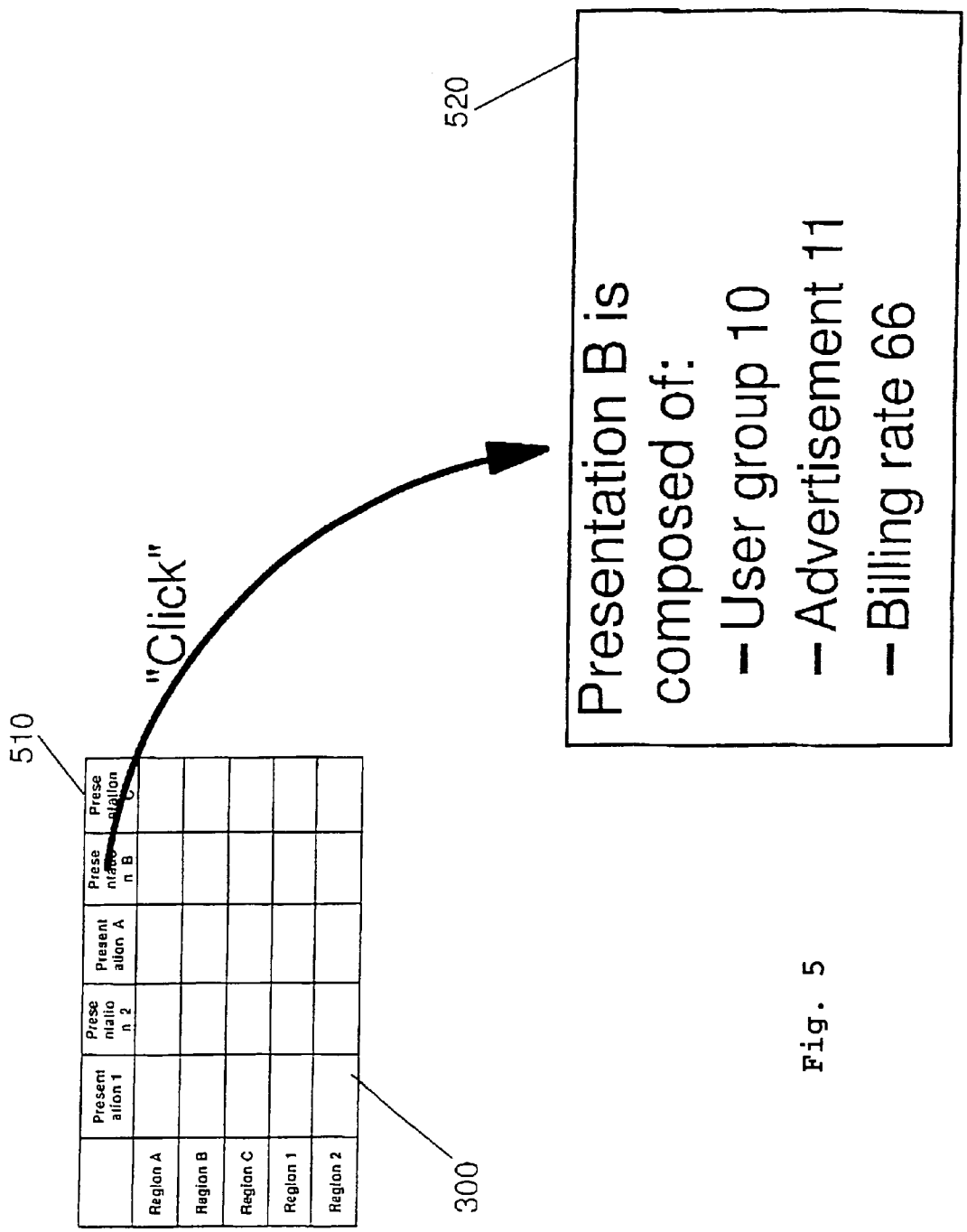
FIG. 5 show an expansion of a Catalog Element.

FIG. 5 shows a case which uses matrix, 300, when the user selects ("clicks on") a catalog axis element, 510.

In this situation, information about the constitution of the catalog element is displayed, 520.

Figure 6:
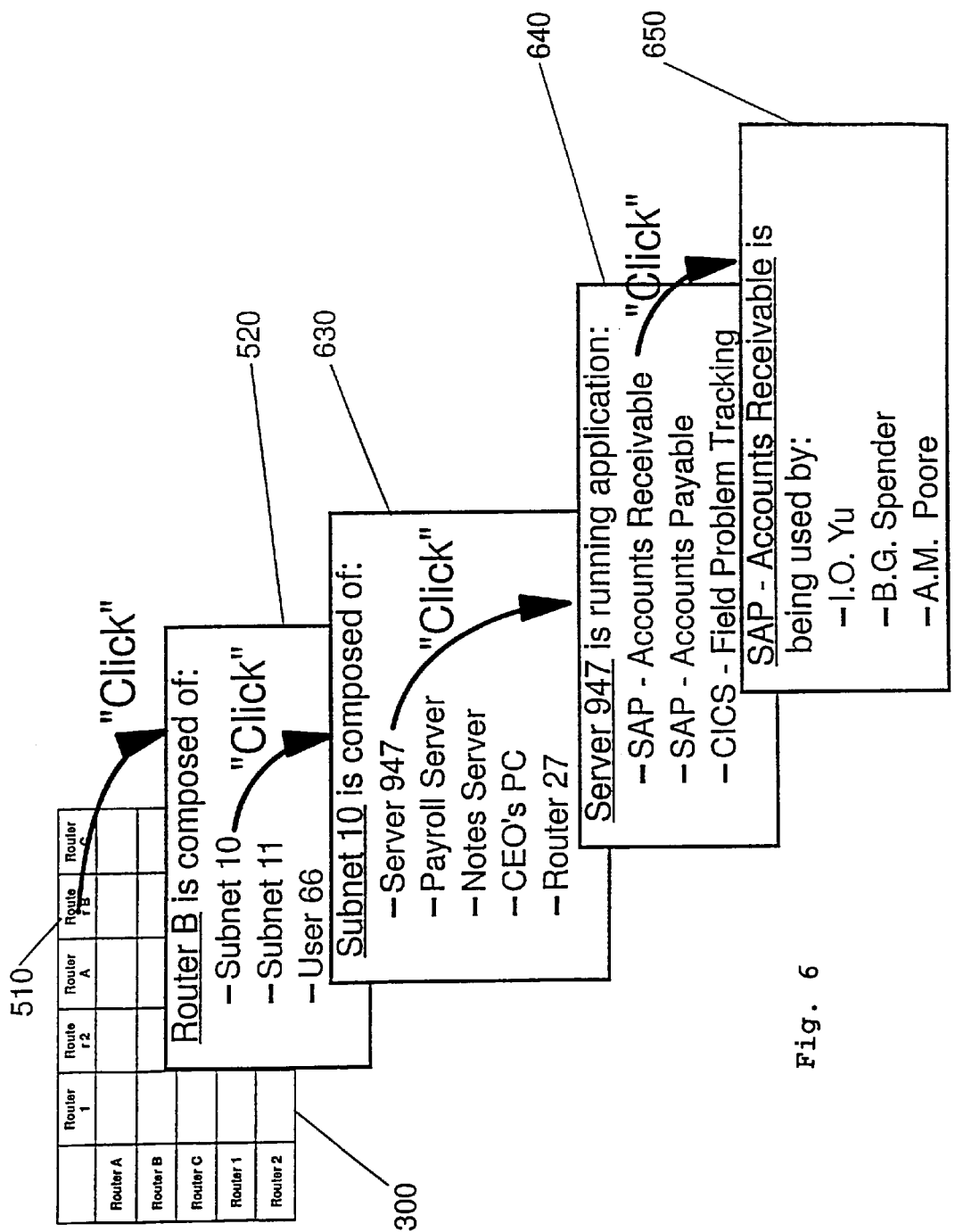
FIG. 6 shows an expansion of a Catalog Element that is in itself a Catalog.

This approach is extended to elements of a catalog that are in and of themselves a catalog. In this situation catalog/elements are embedded within other catalog/elements. FIG. 6, shows a case using matrix 300, wherein one selects element, 510, and obtains that which constitutes this element, 520. Now, when one selects ("clicks on") Subnet 10, in 520, a sub-catalog 630 is displayed. Sub-catalog 630 is a list of network elements within Subnet 10. Now, when one selects ("clicks on") one of the network elements of catalog 630, one is shown a sub-catalog, 640. In this case, sub-catalog 640 is a list of applications executing on that network element. Since, in general, network elements are not limited to traditional network equipment, but may also include hosts and clients, representation of additional relevant information is possible. For example, one could further select (click-on) one of the applications and be shown a catalog, 650, (a list) of users of that application. Furthermore, one could select (click-on) a user and view usage statistics about that user. This process can continue to show more and more embedded information regarding a connection.

Figure 7:
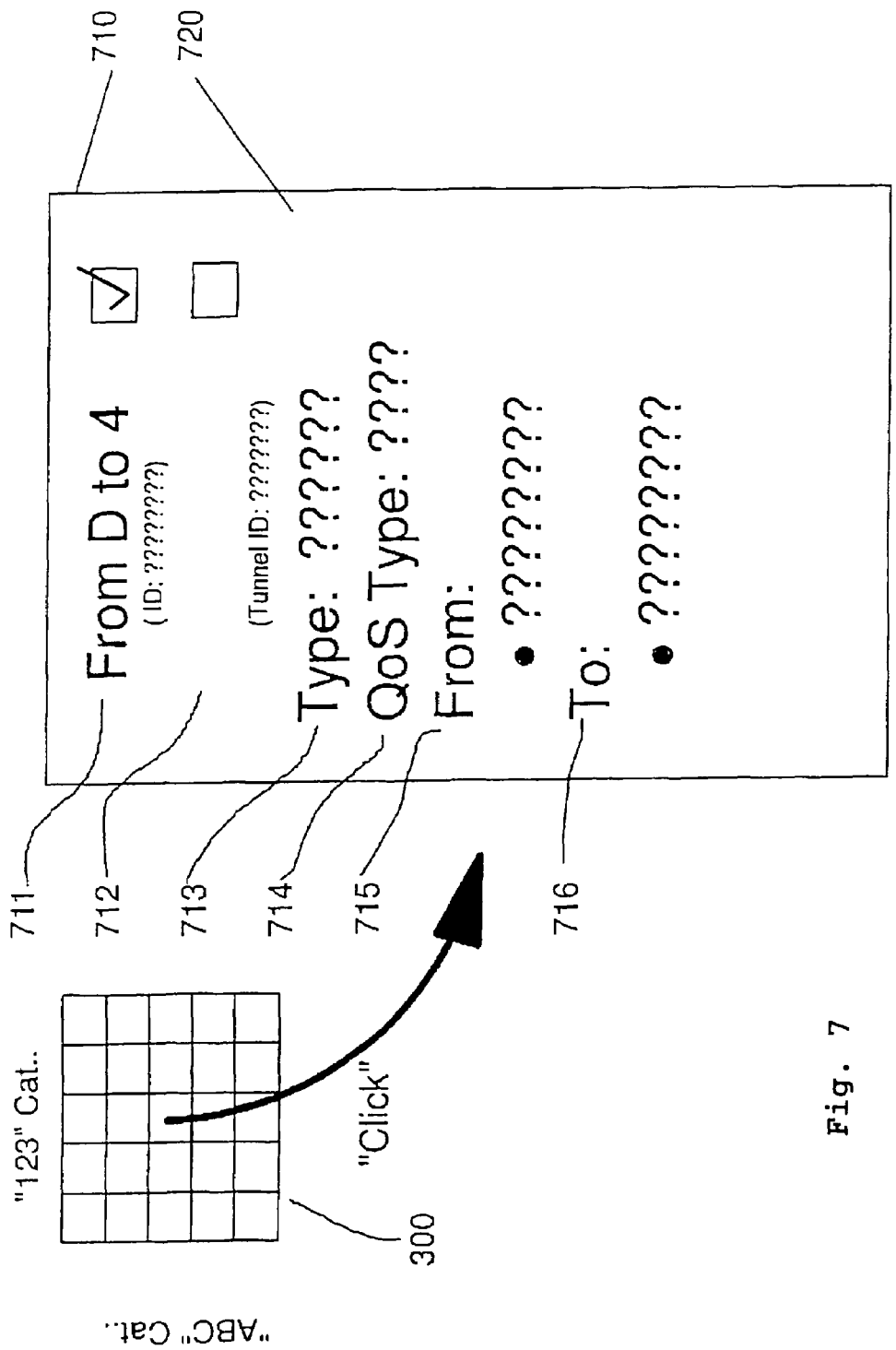
FIG. 7 shows an example of input/output block for a connection identified by the intersection of catalog elements.

Now we consider an example of an initial configuration. It is noted that details of this step are generally implementation dependent and may also vary with the network type. FIG. 7 shows a way to configure connectivity between two endpoints. In this simplified example, it is assumed that a user is trying to configure an IPSec based VPN and must specify the type of tunnel, the type of QoS and the user of the tunnel. The network administrator displays the catalogs of interest along the edges of the matrix, 300, and selects (clicks on) an intersection of endpoints within the matrix. This brings up, 710, which is a set of catalogs or lists which offer the connectivity attributes that can be or should be set or a wizard to aid in the choices of appropriate values for the attributes.

For illustration simplicity and clarity, the concept of multiple connections between the same endpoints as noted above is not shown in the following illustrations.

Figure 8:
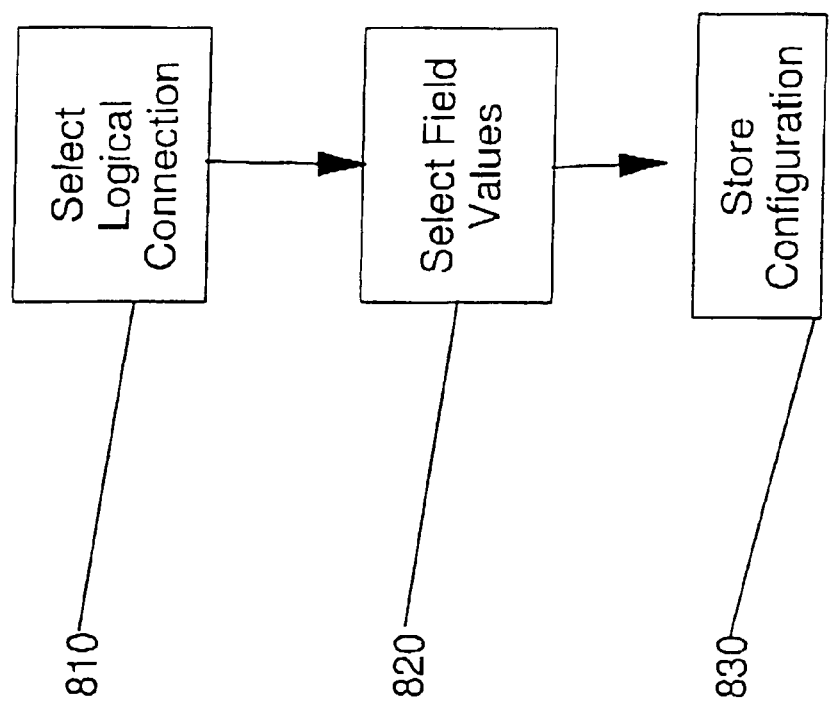
FIG. 8 shows an example of steps for configuring a network.

In one embodiment, the steps for configuring are as shown in FIG. 8.

Step 1. Select Logical Connection by "clicking on" or selecting an intersection point 810. This brings up a "selection box" that contains fields for the pertinent information.

[Thus, in the example of FIG. 7, each direction 711, 712, is configurable separately so as to give meaning to the From, 715, and To, 716, fields. It is assumed that the catalogs of tunnel types 713, QoS types 714, and potential tunnel users have been previously populated. The question marks 720 indicate fields that when selected, a "wizard" or catalog of possible values is displayed. for example, a wizard is displayed when the catalog of values is not complete or to help in selecting the value from a catalog.]

Step 2. For each field, select a value from a catalog of possible values, 820.

Step 3. After selecting values for all fields, the user has completed the configuration for the connection between the two end points and the configuration is stored for retrieval and/or display as desired, 830.

It is noted that all examples are only representative illustrations of the invention, and are not comprehensive enumeration of the fields that must be completed for configuration in a particular embodiment.

Figure 9:
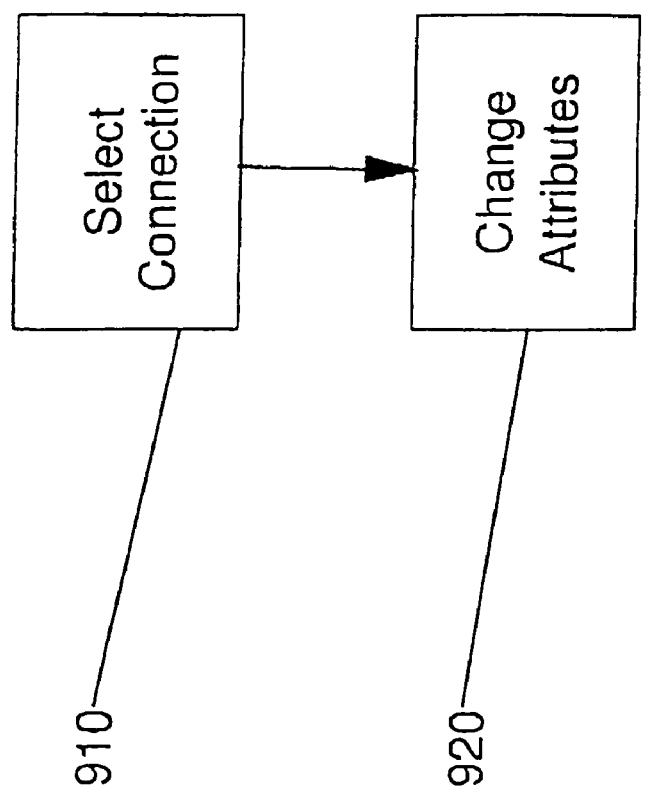
FIG. 9 shows an example of steps for changing a connection.

An embodiment for changing configuration is shown in FIG. 9. The same concept used for initial configuration is used for modifying an existing configuration. The steps are as follows:

Step 1. Given a connection exists between two end points as shown by the intersection of an element from two matrix displayed catalogs, the user selects that connection from the matrix intersection that represents the connection, 910.

Step 2. Given the matrix intersection connection selection, the user changes the attributes of the connection by "clicking-on" that selection, 920. This brings up a selection block that contains changeable information. For example, this may be the same selection block that was used to configure field which results in the display of a catalog whose elements could be used in the field, or a wizard may become available to configure the field.

Because the elements that form axis of the matrix can be catalogs in and of themselves, a matrix intersection cells can represent a catalog of connections. This catalog of connections can operate in a way similar to the way shown in FIG. 6. For example, assume a highest level catalog is named east coast. It includes elements which are in and of themselves catalogs, namely: Miami, Atlanta, Durham, and Hawthorn. Each of these includes elements which are in and of themselves catalogs. The Miami catalog has included elements, namely: router 1, router 2, router 3. Each of these included elements are catalogs that contain other included elements. Thus, router 1 catalog contains elements interface 1, subnet w.x.y.z., specific IP address a.b.c.d. and so on.

The phenomenon of embedding intersections within other intersections may continue as needed by the particular application and network. Thus one could begin with a 1×1 matrix of each coast verses east coast, which only has a single intersection cell, generates an expanded "submatrix" whose both axes contain cities, namely:

Miami, Atlanta, Durham, Hawthorn. Selecting the intersection, Miami verses Miami, generates an expanded submatrix whose axis contains a list of routers, namely: router 1, router 2, router 3. Further, selecting the intersection, router 1 versus router 1, generates an expanded submatrix whose axis contains network components, namely: interface 1, subnet w.x.y.z., specific IP address a.b.c.d. One could then select any of these network component intersections, say interface 1 verses subnet w.x.y.z. This intersection represents this particular connection of the many possible within the network. This operation is herein referred to as matrix expansion. Matrix expansion is used to satisfy the needs of the particular application and/or user. It allows the systematic selection and display of any of the available levels of embedded intersection cells.

The concept of "matrix abstraction" may be employed with significant benefits in accordance with the present invention. This is because the matrix intersection of catalogs of catalogs represent a catalog of connections, one can abstract very large configurations and display these configurations by displaying the topmost catalog. The matrix representation of the topmost catalog is said to be abstracted from the main or total network matrix. Consider the case when a highest level catalog name east coast contains four elements. These four elements are in and of themselves sub-catalogs of cities, namely: Miami, Atlanta, Durham, Hawthorn. Assume that each of these cities have three elements. These three elements each further contain 3 elements which are in and of themselves sub-catalogs.

[For example, the Miami catalog contains elements which are router sub-catalogs, namely: router 1, router 2, router 3;

each of these router sub-catalogs contain 3 network elements, e.g. the router 1 catalog contains network elements, namely: interface 1, subnet w.x.y.z., specific IP address a.b.c.d.]

Then the total number of elements represented by the top-level catalog is 4×3×3=36 elements. This has a total of 1296 (36×36) connection possibilities which may be displayed in a systematic manner using the representation of the present invention. All of these result from the single cell 1×1 matrix of east coast verses east coast as the specified starting point. Thus, because a user can arbitrarily form catalogs, which can also be catalogs of catalogs, the user can abstract the connections to any level desired in accordance with the present invention.

A further benefit of the representation of the present invention is the concept of matrix inheritance. As noted, making use of the abstraction property, one defines a matrix with a row of one or more catalogs versus a column of one or more catalogs. Generally, one or more of the catalogs includes elements that are in and of themselves sub-catalogs. The concept of inheritance provides the ability of propagating an inheritable action and/or attribute to an entire inheritance group. In one embodiment this is accomplished just by performing, adjusting or setting that action/attribute at a group parent. In alternate embodiments the action/attribute is inherited by performing, adjusting or setting that action/attribute at any group member. Thus, when an action (e.g. a parameter) is done at a intersection cell, the action is inherited by all elements of all the sub-catalogs of catalogs in the entire inheritance group.

For instance, if the highest level catalog, named east coast, contains 4 elements which are in and of themselves sub-catalogs, (named: Miami, Atlanta, Durham, Hawthorn), and each of these contains 3 elements which are in and of themselves sub-catalogs, (e.g., the Miami catalog contains router 1, router 2, router 3), and each of these contains 3 elements, (e.g. the router 1 catalog contains elements interface 1, subnet w.x.y.z, IP address a.b.c.d) and a 1×1 matrix of east coast versus east coast was specified, any action done to the intersection formed by the 1×1 (single-cell) matrix (being the group parent) is reflected into all the 1296 connections included within that single matrix cell.

In accordance with the present invention, the matrix display concept can be used in the context of monitoring of all or some connections. Given that the intersections in the matrix can indicate connections, one can display many dynamic parameters of elements, connections and/or catalogs with the use of colors or symbols. As an illustration, one embodiment uses the following color scheme, applied at the intersection point of elements in the matrix catalogs, to display status about connections between elements in the catalogs:

Black—connection is not currently configured;

Yellow—connection is configured, but not currently enabled;

Green—connection is configured, enabled and operating correctly;

Red—connection is configured and enabled but not operating correctly (e.g. QoS not being maintained); and Flashing Red with sound—connection has a serious problem, e.g. a potential security violation such as hacker attempting to insert traffic into the connection has been detected.

The different types for "monitoring" information that can be displayed is large and limited only by imagination of the implementor. Other examples include performance or loading information, i.e. yellow—no traffic observed in last observation period, green—medium loading, red—more than 85% utilization, flashing red—excessive packet loss.

Figure 10:
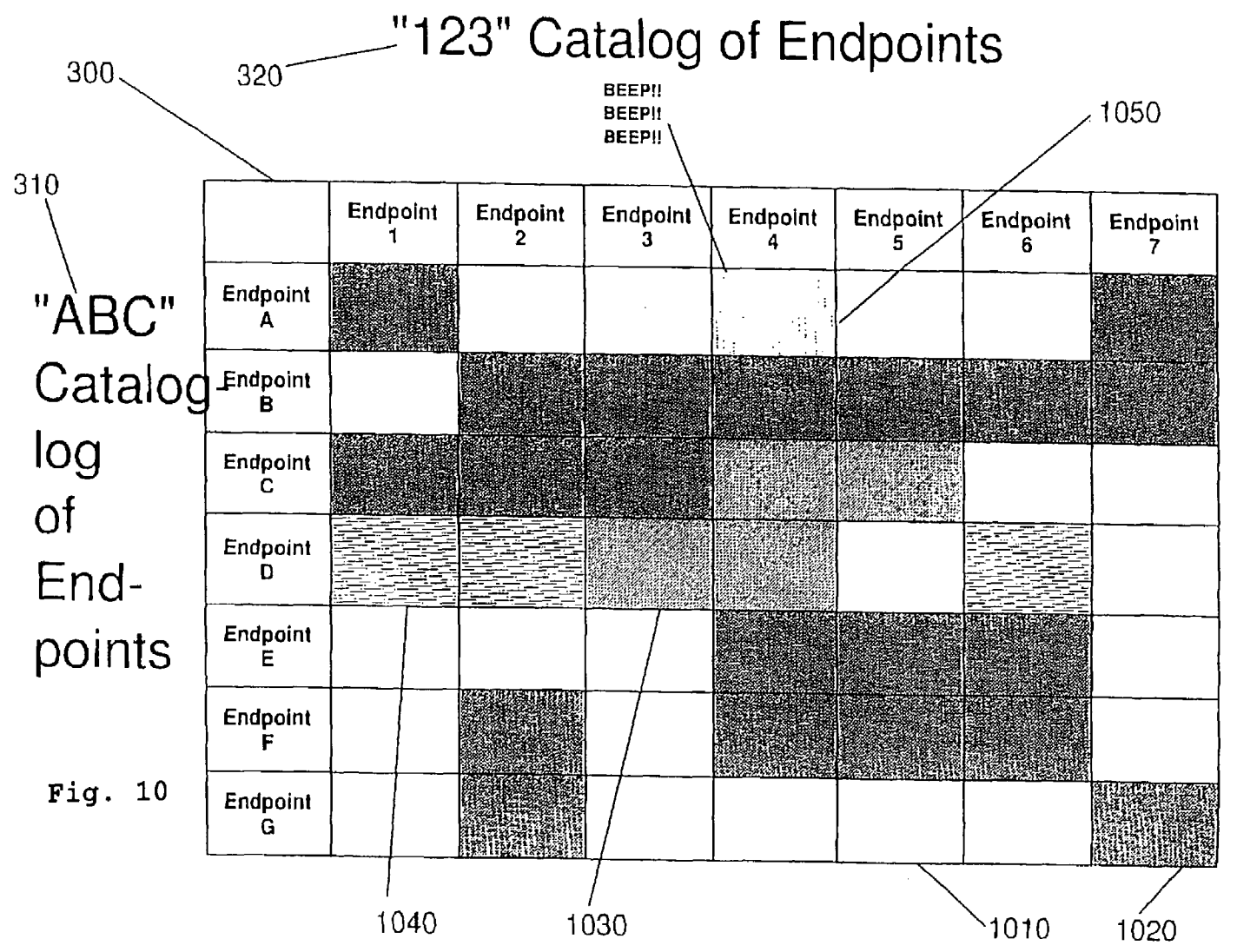

FIG. 10 shows a black and white example of displaying monitored connections using different types of cross hatched lines for different status items. It shows the status indicated by the direction of the slash.

1010 (No lines)—no connection configured;

1020 (Grid slashes)—connection configured, but not enabled;

1030 (Reverse slashes)—connection configured, enabled and operating correctly;

1040 (Horizontal slashes)—connection configured, enabled but not operating correctly (e.g. QoS not being maintained);

1050 (Vertical slashes)—hacker attempting to insert traffic into the connection. A BEEP indicates an audio alarm is sounded.

It is noted that FIG. 10 is only an illustration. It is not a comprehensive enumeration of the information that can be displayed. Furthermore, the monitoring and displaying functions are not limited to the connection, but can be extended to the resources that make up the connection or that constitute the end elements, etc. As known to those skilled in the art, the concepts of this invention do not have a dependency on the type of information displayed. For example, it can be dynamic and/or static, fixed or variable, short form or long form, continuous or intermittent, etc.

In accordance with the present invention, the connection representation concept is useful among other things, for identifying and solving network operation problems, tuning parameters of network elements and/or connections, and scheduling specific tasks that are triggered by events in the network or simply initiating them directly. This may include actions or tasks for a connections. Thus, since intersections in the matrix can indicate information about connections, one can be provided with an ability to select ("click on") an intersection and initiate an action or tasks.

Examples of actions or tasks include:

Retrieval of additional information/statistics (such as bytes/sec, size of frames, traffic rate ranked by sending address, etc.)

Take action (such as test connectivity between the end-points, manually refresh the keys, halt traffic, etc.)

Tuning one or more connections (such as alter the QoS parameters, change the mix of traffic allowed through the connection, alter buffer sized, etc.)

Setting alarms, alerts and/or thresholds to use when monitoring a connection.

Figure 11A:
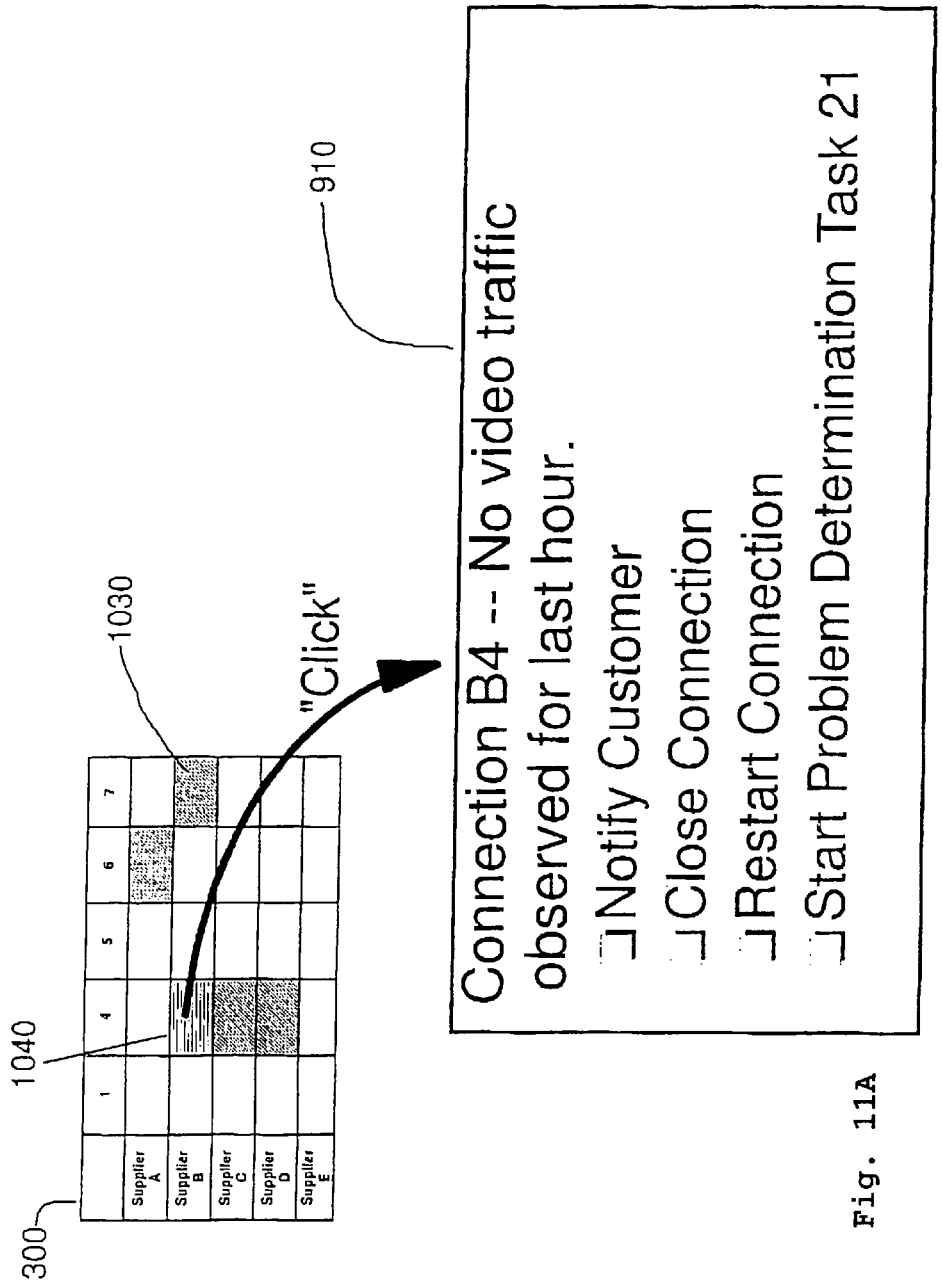
FIGS. 11A and 11B show examples of a matrix of connections showing possible problem determination and tuning method.

An example illustrating a problem determination process is shown in FIG. 11. FIG. 11 uses the connection matrix, 300. One selects an intersection and brings up a display, 910, that aids in problem determination or tuning. This could include the setting of thresholds, etc.

Figure 11B:
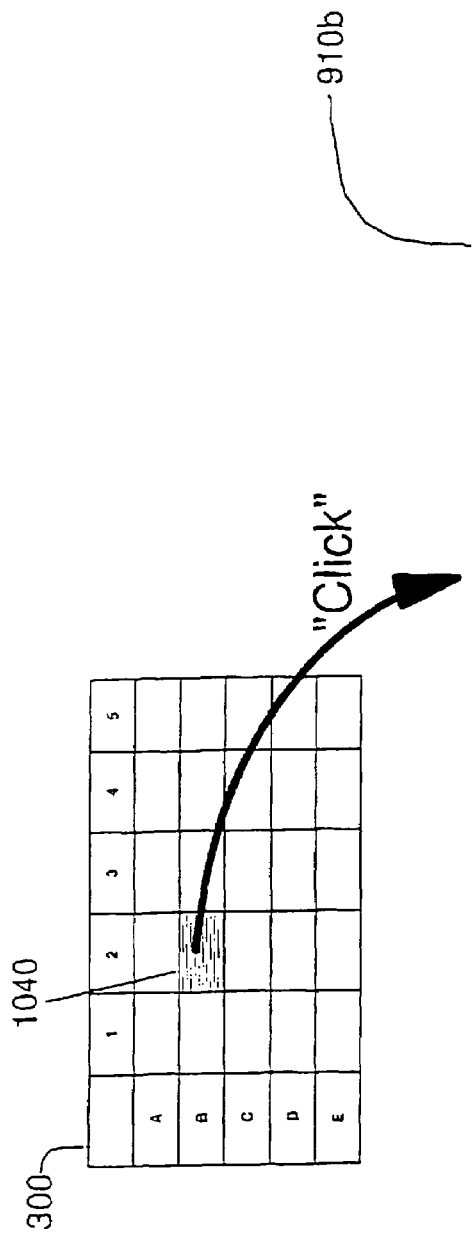

The matrix method may also be used to display the information about usage patterns between the supplier of video service and the consumer. In FIG. 11B, the matrix 300, shows the relationship between video suppliers A, B, C, . . . and consumers of the video stream 1, 2, 3, . . . . Selecting an intersection item equating to relationship between a supplier and a user, 1040, yields a display of the viewing patterns of the consumer, 910b. From this, one can change the mix of commercials (more sports, less sports, etc.) to that user or set of users. Note that because of the concept that an element in the matrix can represent a set of users or an individual user, this same technique can be used to alter the mix of commercials for groups of viewers.

Additional modifications of the matrices and/or cells or elements satisfy particular video provider requirements, such as a list of users, user statistics regarding such things as demand as a function of: user age, education, geography, viewing time of day, response to advertisements; demand satisfaction failure rate and failure causes; rate of view to completion; cost monitoring information, customer payment information; etc.

Additional modifications to satisfy particular user requirements, such as a list of items user is in the middle of viewing; menus of videos that are to be dropped and the date of dropping; charge variations; special features and offers; statistics regarding groups to whom the video was shown, including such things as user age, education, geography; etc.

Addition modification of the matrices and/or elements are dependent on dynamics of customer demands and use. New and/or different matrixes, elements and node levels are created in response to changes in customer-set in different geographic areas and as affected by local, national or international finances and/or occurrences. (Academy awards; actor in the news; political and/or social changes; current events; change of season; etc.)

Figure 12:
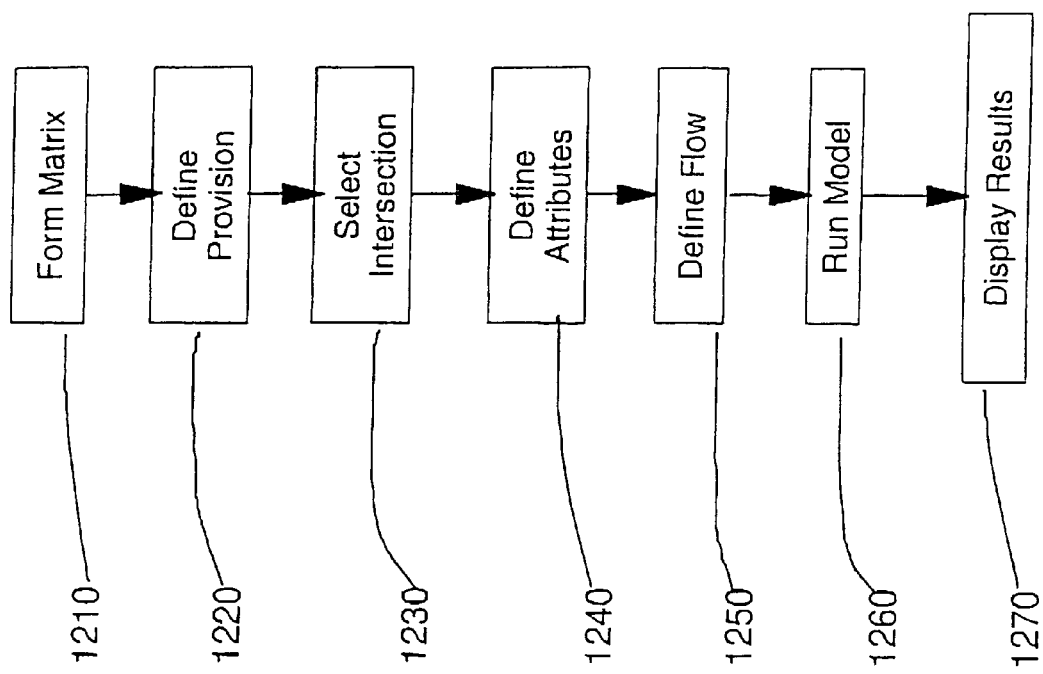
FIG. 12 shows an example of steps for modeling a network.

An embodiment of the present invention performs modeling as shown in FIG. 12, The figure shows steps for the matrix display being used as an input method for modeling tools.

Step 1. Using the matrix method described above, 1210, one defines the network to be modeled, 1220, i.e., define the resources (endpoints) and the connectivity between resources;

Step 2. Given a matrix of connections, 300, one could select an intersection, 1230, and define the attributes, 1240, of the connection, i.e., maximum frame size, TCP/IP window size, etc. One could also define the attributes of the endpoint, i.e., buffer size, speed, etc.;

Step 3. Given the matrix of connections and endpoints and their capabilities, one could then:
  Define a work load to flow through the connection and/or between endpoints;
  Define the rate of traffic to flow through the connection; and/or
  Define dynamic embodiments of a flow 1250;
Step 4 Run the model 1260; and
Step 5 Display the results 1270.
  One could display results in the same method as one monitors the network (see above).
  One could display results within the matrix or endpoints.

This method describes a way to represent relationships between entities. Given this representation, it then provides a framework to perform actions based on the relationship. The entities are often said to constitute a network of elements. The elements and the network can be quite generic. Examples include:
  a computer networks where the elements are communications devices such as routers or firewalls or combinations of devices;
  networks based on any level in a protocol stack, such as applications connectivity at the application layer or MAC (Media Access Control) connectivity at the MAC layer;
  An example of an application is the representation of database applications that have connectivity between themselves;
  An example of a MAC layer are MAC address domains connected by LAN bridges. Other examples are known to those skilled in the art.
  IP networks where elements are devices that contain an IP protocol stack;
  Switching systems, including data or telephone systems;
  Water systems where the elements are the supply points and the usage points; and
  Distribution systems where the elements are warehouses and retail stores.

The representation method and framework consists of grouping the elements into catalogs or sets. A catalog is created by standard combinatorial operations that include but are not limited to the following:
  add an element to a catalog;
  deleting an element from a catalog;
  change an element in a catalog;
  copy or move an element from another catalog;
  create a catalog that represents the intersection of elements of two or more other catalogs;
  create a catalog that represents the union of elements of two or more other catalogs; and
  other element and/or catalog operations known to those skilled in the art.

There is generally no restriction on the number or type of elements in a catalog.

Generally, an element in a catalog can be of one of two types:

"atomic" element—the element does not contain other elements, or

"catalog" element—the element is a catalog of other elements.

In the following claims, both types of elements are generically referred to as elements. Thus catalog is a hierarchical grouping construct—a catalog is made up of elements, some of which can themselves be catalogs of other elements, and so on. It is noted that a catalog can contain both "catalog" elements and "atomic" elements with no restriction on the number of either type of elements. In the following, the elements that are members of a catalog that is itself an element within a higher level catalog can be referred to as "sub-elements" of the higher level catalog.

Some embodiments provide for any combination of the following capabilities: matrix and/or element expansion; logical set manipulation of catalog elements to form changed and/or new matrices, changed and/or new elements, and/or changed and/or new catalogs; catalog manipulation an/or combination; formation of one or more super-catalogs and/or super-elements representing a catalog of catalogs; display of a plurality of trees and/or portions of trees in a variety of tree formats and shapes; and formation and/or manipulation of sub-catalogs and/or sub-elements from one or more catalogs, matrices and/or elements.

Also, in some embodiments, a tree may have more than one so called root node. The elements/nodes emanating from each of the plurality of roots and 920 may be common and be ultimately connected to each root at any subsequent tree level as appropriate to the application. Thus a particular node may be ultimately connected to a root-A and to a root-B. An example of this occurs when root-A represents corporate division-A and root-B represents corporate division-B, and the node represent the costs of a shared legal department.

While it is apparent that the invention herein disclosed is well calculated to fulfill the embodiments stated above, it will be appreciated that numerous modifications and embodiments may be devised by those skilled in the art, and it is intended that the appended claims cover all such modifications and embodiments as fall within the true spirit and scope of the present invention.

The invention claimed is:

1. A method for representing interconnections of a plurality of elements of a video-on-demand services system, said system including a multitude of servers for storing video data, a multitude of customers for receiving said video data and viewing said video data on customer video monitors, and a system administrator for configuring and monitoring connections between said servers and said customers, and wherein said video-on-demand services are provided by a service provider to the multitude of customers and enable said customers to choose interactively various programs stored in a video source and to view a selected program at any time on the customer video monitors, the method comprising:
  providing a first catalog for a first subset of said elements, and providing a second catalog for a second subset of said elements;
  creating a matrix of connection cells representing services provided by said service provider to said multitude of customers, each cell formed by an intersection of a pair of elements, wherein a first element of each pair is taken from the first catalog and a second element of each pair is taken from the second catalog, including the step of said system administrator interacting with said cells to configure and to monitor the connections between said servers and said customer video monitors; and
  forming a connection representation for at least a subset of the pairs, the connection representation for each cell represents a service provided by said service provider to a respective one of said multitude of customers; and wherein, when one of the customers requests a video program, the system administrator interacts with the cells of the matrix (i) to select one of the servers to provide the requested video program to said one of the customers and (ii) to assign to said one of the customers one or more of a multitude of video data channels to configure a video data path between the selected one of the servers and the video monitor of said one of the customers for transmitting the requested video program from said selected one of the servers to the video monitor of said one of the customers for viewing by said one of the customers, and wherein commercials are provided with the video program, and the commercials are selected based on displayed video usage patterns of the customers; and wherein:

each element of the first catalog corresponds to a primary server;

each element of the second catalog corresponds to a secondary server;

each of the intersections of the matrix represents a logical connection of a presentation flowing from one primary server to one secondary server; and multiple presentations are flowing between the one primary server and the one secondary server, and said multiple presentations are represented by a stack of blocks shown on said each of the intersections, each of said blocks representing a different one of said multiple presentations.

2. A method as recited in claim 1, wherein at least one element is a catalog of sub-elements, and the method further comprises the step of including all sub-elements in the matrix.

3. A method as recited in claim 1, wherein at least one of the catalogs includes a plurality of sub-catalogs.

4. A method as recited in claim 1, wherein at least a portion of one catalog is formed using combinatorial operations upon elements of other catalogs.

5. A method as recited in claim 1, further comprising displaying at least one portion of the matrix.

6. A method as recited in claim 1, further comprising employing a wizard to form at least a subset of the elements.

7. A method according to claim 1, wherein:

each of the cells of the matrix represents one of the customers; and the step of the system administrator interacting with said cells includes the steps of:

expanding one of the cells to form an expanded cell showing information about the video use of the one of the customers represented by said one of the cells; and the system administrator monitoring said expanded cell to monitor video use patterns of said one customer and changing the video data supplied to said one customer based on said monitored video use patterns.

8. An article of manufacture comprising a computer usable medium having computer readable program code means embodied therein for causing representation of interconnection of a plurality of elements of a video-on-demand system, the computer readable program code means in said article of manufacture comprising computer readable program code means for causing a computer to effect the steps of claim 1.

9. An architecture for providing information about a video-on-demand service system, said system including a multitude of servers for storing video data, a multitude of customers for receiving said video data and viewing said video data on customer video monitors, and a system administrator for configuring and monitoring connections between said servers and said customers, and said service system further including a set of video-on-demand elements, wherein said multitude of customers are able to choose interactively various programs from a video-on-demand service provider and to view a selected program at any time on the customer video monitors, the architecture comprising:

a matrix module forming a video-on-demand information system matrix representing services provided by said service provider to said multitude of customers, said matrix having at least one matrix row element and at least one matrix column element, an intersection of each said at least one matrix row element with each said at least one matrix column element forming a matrix cell representing a service provided by said service provider to a respective one of said multitude of customers;

a set of video-on-demand elements, a first subset of said set having a connection requirement with a second subset of said set;

a first catalog including at least one video-on-demand element forming said at least one matrix row element;

a second catalog including at least one video-on-demand element forming said at least one matrix column element, wherein each matrix cell represents a video-on-demand relationship between each video-on-demand element of the first catalog and each video-on-demand element of the second catalog to enable systematic cooperation among video-on-demand elements according to a video-on-demand requirement; and means to enable said system administrator to interact with the matrix module to configure and to monitor the connection between said servers and said customer video monitors; and wherein, when one of the customers requests a video program, the system administrator interacts with the cells of the matrix (i) to select one of the servers to provide the requested video program to said one of the customers and (ii) to assign to said one of the customers one or more of a multitude of video data channels to configure a video data path between the selected one of the servers and said one of the customers for transmitting the requested program from said selected one of the servers to the video monitor of said one of the customers for viewing by said one of the customers, and wherein commercials are provided with the video program, and the commercials are selected based on displayed video usage patterns of the customers; and wherein:

each element of the first catalog corresponds to a primary server;

each element of the second catalog corresponds to a secondary server;

each of the intersections of the matrix represents a logical connection of a presentation flowing from one primary server to one secondary server; and multiple presentations are flowing between the one primary server and the one secondary server, and said multiple presentations are represented by a stack of blocks shown on said each of the intersections, each of said blocks representing a different one of said multiple presentations.

10. An architecture as recited in claim 9, wherein at least one video-on-demand element is a catalog of video-on-demand sub-elements.

11. An architecture as recited in claim 9, wherein at least one video-on-demand element is a catalog of elements only peripherally related to video-on-demand.

12. An architecture as recited in claim 11, wherein the catalog of elements only peripherally related to video-ondemand includes an item selected from the group of items including customer habits, customer credit card and/or internet purchases, customer's friends, and customer product data.

13. A method of providing multilevel information about a plurality of video-on-demand related entities and resources, wherein said video-on-demand related entities and resources in a video-on-demand service system, said system including a multitude of servers for storing video data, a multitude of customers for receiving said video data and viewing said video data on customer video monitors, and a system administrator for configuring and monitoring connections between said servers and said customers, and wherein said video-on-demand related entities and resources are provided by a service provider to said multitude of customers and enable said customers to choose interactively various programs stored in a video source and to view a selected program at any time on the customer video monitors, the method comprising the steps:

generating a display, on a computer display screen, of a tree having a plurality of nodes, including displaying video usage patters of the customers; and embedding in the nodes information about a plurality of the video-on-demand related entities and resources provided to said multitude of customers, including the step of said system administrator interacting with said nodes of said display to configure and to monitor the connections between said servers and said customer video monitors; and wherein, when one of the customers requests a video program, the system administrator interacts with the nodes of the display (i) to select one of the servers to provide the requested video program to said one of the customers and (ii) to assign to said one of the customers one or more of a multitude of video data channels to configure a video data path between the selected one of the servers and the video monitor of said one of the customers for transmitting the requested video program from said selected one of the servers to the video monitor of said one of the customers fore viewing by said one of the customers, and wherein commercials are provided with the video program, and the commercials are selected based on the displayed video usage pattern; and wherein:

each element of the first catalog corresponds to a primary server;

each element of the second catalog corresponds to a secondary server;

each of the intersections of the matrix represents a logical connection of a presentation flowing from one primary server to one secondary server; and multiple presentations are flowing between the one primary server and the one secondary server, and said multiple presentations are represented by a stack of blocks shown on said each of the intersections, each of said blocks representing a different one of said multiple presentations.

14. A method as recited in claim 13, wherein the plurality of video-on-demand related entities and resources include an entity and/or resource selected from: video-on-demand providers; video-on-demand composers/manufacturers; video-on-demand related sellers; video-on-demand advertisers; video manufacturers; video databases; video renters; and any combination of the above.

15. An article of manufacture comprising a computer usable medium having computer readable program code means embodied therein for causing provision of multilevel information about relationships between users and items of a plurality of video-on-demand related entities and resources, the computer readable program code means in said article of manufacture comprising computer readable program code means for causing a computer to effect the steps of claim 14.

16. An article of manufacture as recited in claim 15, wherein the video-on-demand resources are holdings of groups of products.

17. An article of manufacture as recited in claim 15, wherein the relationships include inventory information.

* * * * *